United States Patent Office 2,801,843
Patented Aug. 6, 1957

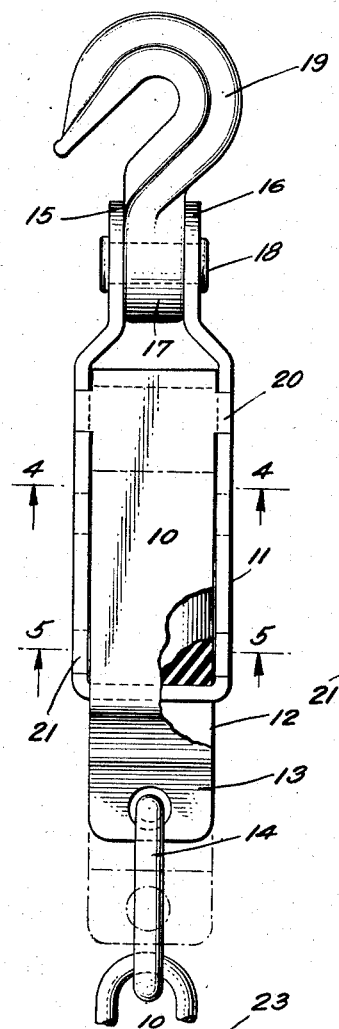
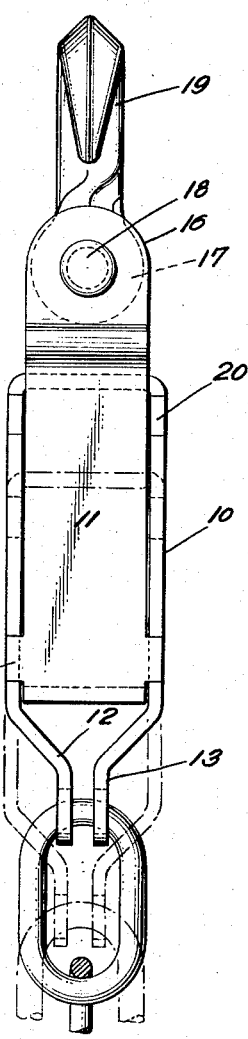
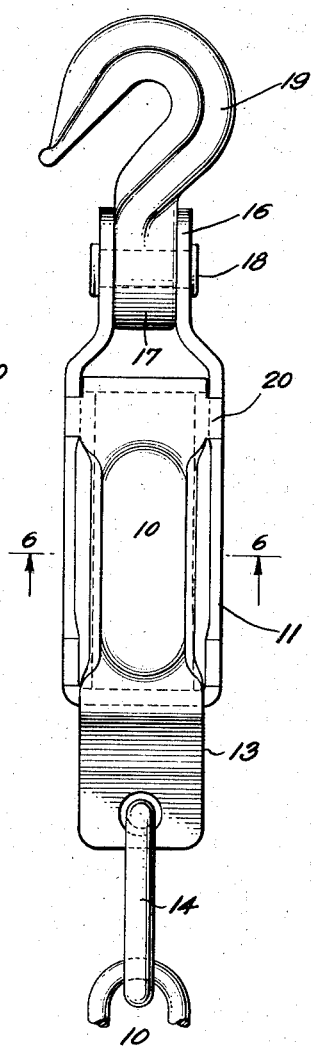
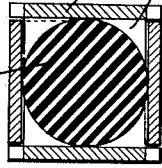
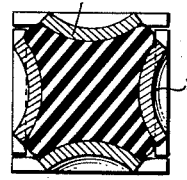
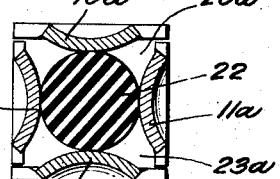
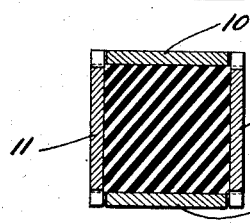
INVENTOR
William Robert MacCluney.

2,801,843

SAFETY LINK

William Robert MacCluney, Worcester, Mass.

Application January 27, 1954, Serial No. 416,202

1 Claim. (Cl. 267—70)

This invention relates to a safety link for use with cables, or chains, or the like.

It is an object of this invention to provide a link which may be inserted in any strain resisting element to absorb sudden shocks.

It is a further object to provide a device which may be readily attached to a chain, or cable, in a manner such that the strain may be imposed along the center line of strain of the device, and more particularly to provide a device having a grab hook that may readily be hooked over a link of a chain and yet transmit the strain along the center line of strain.

It is a further object to provide a grab hook for use in the chain or the like in which the hook portion lies in a plane transverse to the axis of the pivot of the hook.

It is a further object to provide such a device which will provide a fairly constant pressure yield ratio so that it may, if desired, be calibrated to show the amount of strain imposed.

The device is of the type which comprises generally a pair of movable link members separated by an elastic body such as rubber, so arranged that when strain is imposed upon the link members it will be transmitted from one to the other through the elastic body.

In this type of device, as heretofore constructed, the elastic body has not been effectively guided so that its direction and degree of distortion under strain were uncertain and irregular. This has been overcome in this invention in such a manner that all portions may expand outwardly in response to the compressive strains imposed by the load.

The device accordingly comprises the structure hereinafter described, two embodiments of which are shown in the accompanying drawings in which Fig. 1 is a front elevation of a device embodying this invention. Fig. 2 is a side elevation thereof; Fig. 3 is a front elevation of a modified form; Fig. 4 is a section on the lines 4—4 of Fig. 1 before strain is applied, Fig. 5 is a view on the lines 5—5 after the strain is applied. Fig. 6 is a view along the line 6—6 of Fig. 3 before strain is applied and Fig. 7 a similar view after strain is applied.

In the drawings the numerals 10 and 11 represent two interlinked members each having at one end a draft member and together forming a chamber having a square cross-section. Thus the member 10 has its lower side projecting downwardly to form two parallel arms 12—13 in which may be pivoted a link 14 which may form one link of a chain, or to which a chain may be attached.

Similarly, the other member 11 has its corresponding side projecting upward to form two parallel arms 15—16, in which a hook 17 is pivoted. As will be seen the hook portion 19 of the hook 17 is twisted to lie in the same plane as the pin 18 so that when the hook is hooked over one link of a chain, it may be canted to the side by the pull of the chain pivoting about the pin 18 while still keeping the strain line of the chain in alignment with the center line of the safety link.

Means are provided upon each of the members to keep it in alignment with the other members. As shown fingers 20 on the upper part of the member 10 project beyond the side edges of the member 10 to engage the side edges of the member 11 and fingers 21 on the lower part of member 11 project beyond the side edges of member 11 to engage the side edges of member 10.

Extending within both members 10 and 11 where they overlap is a block of an elastic material 22, such as rubber, in position to be compressed by the relative movement of the members when subjected to strain.

It is a characteristic of this invention, however, that the rubber block is supported laterally to prevent it from bending out of alignment, but it is supported to give room for expansion.

In the form of the invention disclosed in Fig. 1 the interior of the enclosure within the members is of square cross section, while the rubber block is cylindrical so that as seen in Fig. 4, before the strain is imposed, the rubber contacts the members along four vertical lines, with the triangular spaces 23 at each corner, but as the strain is increased, the rubber is forced into the spaces 23 while keeping in alignment with the strain.

In the form of the invention disclosed in Figs. 3, 6 and 7 the faces of the members 10 and 11 are bowed cylindrically inward, whereby the center line of each face may engage the rubber block, as in the first embodiment, while the corners 23a comprise a greater cross sectional area to permit a greater longitudinal compression of the block.

The fact that the block of rubber is held in axial position in every strain position, and yet permits a symmetrical lateral extrusion into symmetrically shaped longitudinal recesses, assists in keeping the stress yield uniform for a given load during successive loadings, and it distributes the yield evenly, proportionate to the strain imposed.

Moreover, when the block is compressed to the utmost, it is so thoroughly contained that even very extensive strains will not break, or destroy it, or pull the links apart.

It is to be noted that in both embodiments the members 10 and 11 are preferably made of steel which has a certain resiliency so that when the compression gets to the maximum, as shown in Figs. 5 and 7, a still greater pressure of the rubber block against the members may cause them to bend outwardly somewhat so that the load is cushioned even under extreme strains. This does not, however, reach the point of permanently distorting the members 10 and 11.

What I claim:

A strain safety link comprising two interlocked members, the alternate lateral walls of which define a substantially closed chamber the ends of which are closed by ends attached respectively to said members and the walls of which chamber are cylindrically bowed inwardly toward the axis, a resilient block within said chamber having substantially line contact with said lateral walls and being spaced from said walls between said lines, and draft elements pivoted respectively to said members, whereby strain imposed between said elements will compress said block, permitting it to expand into said chamber between said lines of contact while holding it in axial alignment.

References Cited in the file of this patent

UNITED STATES PATENTS

| | | |
|---|---|---|
| 54,411 | Richards | May 1, 1866 |
| 197,615 | Dawson | Nov. 27, 1877 |
| 315,223 | Belding | Apr. 7, 1885 |
| 377,055 | Wheeler | Jan. 31, 1888 |
| 608,344 | Nesmith | Aug. 2, 1898 |
| 1,021,271 | Sharp | Mar. 26, 1912 |
| 1,236,346 | Pearson | Aug. 7, 1917 |
| 1,798,001 | Seckler | Mar. 24, 1931 |
| 2,091,477 | Grau | Aug. 31, 1937 |